(12) United States Patent
Lu et al.

(10) Patent No.: US 7,308,376 B2
(45) Date of Patent: Dec. 11, 2007

(54) COMPUTER PLATFORM AUTOMATIC TESTING METHOD AND SYSTEM

(75) Inventors: Ying-Chih Lu, Taipei (TW); Chin-Lung Wu, Taipei (TW); Chun-Yi Lee, Taipei (TW); Chia-Hsing Lee, Taipei (TW); Chi-Tsung Chang, Taipei (TW); Ling-Hung Yu, Taipei (TW)

(73) Assignee: Inventec Corporation (TW)

( * ) Notice: Subject to any disclaimer, the term of this patent is extended or adjusted under 35 U.S.C. 154(b) by 369 days.

(21) Appl. No.: 11/051,898

(22) Filed: Feb. 5, 2005

(65) Prior Publication Data
US 2006/0143535 A1    Jun. 29, 2006

(51) Int. Cl.
*G01R 27/28* (2006.01)
(52) U.S. Cl. ..................... 702/117; 702/118
(58) Field of Classification Search ............... 702/117, 702/118
See application file for complete search history.

(56) References Cited

U.S. PATENT DOCUMENTS 5,132,635 A * 7/1992 Kennedy .................. 324/763
5,875,293 A * 2/1999 Bell et al. ................... 714/27

* cited by examiner

*Primary Examiner*—John E. Barlow, Jr.
*Assistant Examiner*—Stephen J. Cherry
(74) *Attorney, Agent, or Firm*—Peter F. Corless; Steven M. Jensen; Edwards Angell Palmer & Dodge LLP

(57) ABSTRACT

A computer platform automatic testing method and system is proposed, which is designed for use in conjunction with a computer platform for performing an automatic testing procedure on a computer-dedicated circuit unit installed on the computer platform, and which is characterized by the capability of performing an automatic testing procedure on a computer-dedicated circuit unit based on a user-specified set of hardware specification data about the computer platform and circuit unit under test, and the capability of automatically generating a test report that lists related data about each faulted part of the circuit unit being tested. This feature allows hardware engineers to more conveniently and efficiently correct faulted parts in the circuit unit being tested.

10 Claims, 4 Drawing Sheets

```
R<IO1,0680>
R<IO2,0400>
R<IO3,0500>

//Remark
//T<title>
//M<type,byte,IO_Base,Offset,Mask>
//S<String number,String>

// Title
T<Full Length riser card>
//      Access method      Access Unit      IO Base      offset      Mask
//      ==============     ===========      =======      ======      ====
M<      1                  ,1               ,#IO1        ,0001       ,01>
M<      01                 ,01              ,#IO1        ,000B       ,02>
M<      01                 ,0001            ,#IO1        ,000B       ,01>

// String
S<0010b,"1U Full Length Riser PCI-X">
S<0000b,"1U Full Length Riser PCI-E">
S<0100b,"Invalid FL Config (Reserved)">
S<0110b,"Invalid FL Config (Reserved)">
S<0001b,"2U Full Length Riser PCI-X / 2x PCI-E">
S<0011b,"2U Full Length Riser PCI-X">
S<0101b,"2U Full Length Riser active Riser PCI-X">
S<0111b,"No Full Length Riser Present">

T<Low Profile riser card>
//      Access method      Access Unit      IO Base      offset      Mask
//      ==============     ===========      =======      ======      ====
M<      1                  ,2               ,#IO2        ,002A       ,02>
M<      01                 ,02              ,#IO2        ,002A       ,1000>

// String
S<0000b,"1U Low Profile Riser PCI-X">
S<0001b,"2U Lower Profile Riser PCI-X">
S<0011b,"No Lower Profile Riser Present">

T<Motherboard Type>
// board id: ICH5R GP125,24,11
//      Access method      Access Unit      IO Base      offset      Mask
//      ==============     ===========      =======      ======      ====
M<      1                  ,2               ,#IO2        ,002A       ,0800>
M<      1                  ,4               ,#IO3        ,000C       ,1000000>
M<      1                  ,4               ,#IO3        ,000C       ,2000000>
// String
S<0000b,"Jarrell 2 MLB (DDRII-400)">
S<0001b,"Jarrell 1 MLB (DDR-266/333">

(Continued on FIG. 2B)
```

FIG. 2A (Continued from FIG. 2A)

```
//LAN staus
//SIO GPIO62,61
T<Low Profile riser card>
//      Access method      Access Unit       IO Base       offset       Mask
//      =============      ===========       =======       ======       ====
M<      1                  ,1                #IO1          ,0010        ,06>
// String
S<0000b,"Onboard NIC port A/B disabled">
S<0001b,"Onboard NIC port A enabled/Port B disabled">
S<0010b,"Onboard NIC port A disabled/Port B enabled">
S<0011b,"Onboard NIC port A/B enabled">

T<BIOS Select partition>
// BIOS Select No. : ICH5R GPI41
//      Access method      Access Unit       IO Base       offset       Mask
//      =============      ===========       =======       ======       ====
M<      1                  ,1                #IO3          ,0039        ,02>
// String
S<0000b,"Bottom Part (2MB) of flash ROM (4MB)">
S<0001b,"Top Part (2MB) of flash ROM (4MB)">
```

FIG. 2B

```
<Full Length riser card>
IO Base:    681, Mask Bit:      1, Reading:    ff
IO Base:    68b, Mask Bit:      2, Reading:    ff
IO Base:    68b, Mask Bit:      1, Reading:    ff
Bit Map:    7
String: No Full Length Riser Present <Low Profile riser card>
IO Base:    42a, Mask Bit:      2, Reading:    8e7e
IO Base:    42a, Mask Bit:   1000, Reading:    8e7e
Bit Map:    1
String: 2U Lower Profile Riser PCI-X <Motherboard Type>
IO Base:    42a, Mask Bit:      800, Reading:    8e7e
IO Base:    50c, Mask Bit:  1000000, Reading:    1bdf
IO Base:    50c, Mask Bit:  2000000, Reading:    1bdf
Bit Map:    1
String: Jarrell 1 MLB (DDR-266/333

<Low Profile riser card>
IO Base:    690, Mask Bit:      6, Reading:    6
Bit Map:    3
String: Onboard NIC port A/B enabled <BIOS Select partition>
IO Base:    539, Mask Bit:      2, Reading:    1
Bit Map:    0
String: Bottom Part (2MB) of flash ROM (4MB)
```

FIG. 3

COMPUTER PLATFORM AUTOMATIC TESTING METHOD AND SYSTEM

BACKGROUND OF THE INVENTION

1. Field of the Invention

This invention relates to information technology (IT), and more particularly, to a computer platform automatic testing method and system which is designed for use with a computer platform for the purpose of performing an automatic testing procedure on a dedicated circuit unit of the computer platform to thereby check whether the circuit unit of the computer platform can operate normally, and if not, capable of automatically generating a test report in electronic form for use by hardware engineers to more conveniently and efficiently correct the faulted parts in the circuit unit of the computer platform.

2. Description of Related Art

In the manufacture of dedicated circuit units for computer platforms, such as motherboards or function expansion circuit cards, it is a standard practice to perform a testing procedure on these circuit units before shipping to the market or customers, so as to assure that each circuit unit can operate normally. If any faulted parts (such as faulted components or signal transmission paths) are found in these circuit units during the testing procedure, the test engineer team should submit a test report to the hardware design department for use by hardware engineers to correct the faulted parts in the circuit unit of the computer platform being tested.

Presently, a standard operating procedure for the testing of computer-dedicated circuit units is manually conducted by test engineers. During this testing procedure, the test engineer needs to first install the circuit unit under test manually onto a computer platform, and then carries out the testing procedure step by step by manually operating the computer platform in accordance with a standard operating procedure for the computer platform to check whether all the components and I/O signals in the circuit unit are normal.

One drawback to the above-mentioned practice of conducting the testing procedure by manual control, however, is that it is quite tedious, laborious, and time-consuming and therefore highly inefficient. Moreover, the test results may be unreliable due to human errors in the operation of the testing procedure. In addition, since a computer manufacturing factory typically has numerous various different models of computer platforms with different hardware specifications in the production line, it would require different standard operating procedures for the test engineers to carry out the testing procedures on different types of computer-dedicated circuit units, making the testing procedures even more tedious, laborious, time-consuming, and highly inefficient.

SUMMARY OF THE INVENTION

It is therefore an objective of this invention to provide a computer platform automatic testing method and system which is capable of performing an automatic testing procedure on a dedicated circuit unit of a computer platform, and if faulted parts are found, further capable of automatically generating a test report for use by hardware engineers to correct the faulted parts in the circuit unit of the computer platform being tested.

It is another objective of this invention to provide a computer platform automatic testing method and system which is capable of performing automatic testing procedures on various different models of computer platforms based on different sets of testing control parameters stored in a database.

The computer platform automatic testing method and system according to the invention is designed for use with a computer platform for the purpose of performing an automatic testing procedure on a dedicated circuit unit of the computer platform to thereby check whether the circuit unit of the computer platform can operate normally, and if not, capable of automatically generating a test report in electronic form for use by hardware engineers to more conveniently and efficiently correct the faulted parts in the circuit unit of the computer platform.

The computer platform automatic testing method and system according to the invention is characterized by the capability of performing an automatic testing procedure on a computer-dedicated circuit unit based on a user-specified set of hardware specification data about the computer platform and circuit unit under test, and the capability of automatically generating a test report that lists related data about each faulted part of the circuit unit being tested. This feature allows hardware engineers to more conveniently and efficiently correct faulted parts in the circuit unit being tested.

BRIEF DESCRIPTION OF DRAWINGS

The invention can be more fully understood by reading the following detailed description of the preferred embodiments, with reference made to the accompanying drawings, wherein:

FIGS. 2A-2B are diagrams showing an example of the contents of a TXT-formatted set of hardware specification data utilized by the computer platform automatic testing system of the invention; and FIG. 3 is a diagram showing an example of the contents of a REP-formatted test report generated by the computer platform automatic testing system of the invention.

DETAILED DESCRIPTION OF PREFERRED EMBODIMENTS

Figure 1:
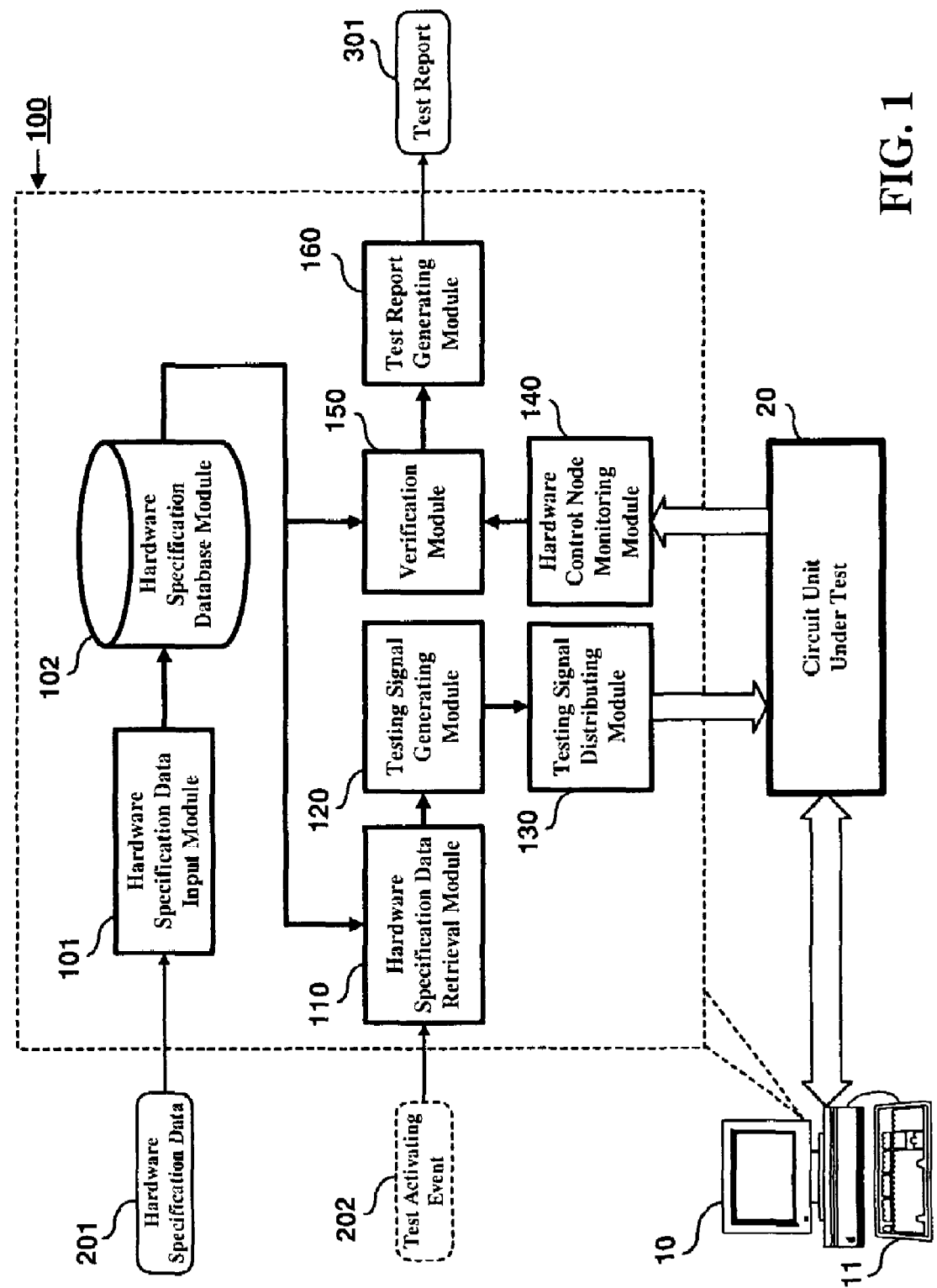
FIG. 1 is a schematic diagram showing the application architecture and modularized object-oriented component model of the computer platform automatic testing system according to the invention.

The computer platform automatic testing method and system according to the invention is disclosed in full details by way of preferred embodiments in the following with reference to the accompanying drawings.

FIG. 1 is a schematic diagram showing the application architecture and modularized object-oriented component model of the computer platform automatic testing system according to the invention (as the part enclosed in the dotted box indicated by the reference numeral 100). As shown, the computer platform automatic testing system of the invention 100 is designed for use in conjunction with a computer platform 10 (such as a desktop computer) that is installed with a dedicated circuit unit 20 (such as a motherboard or a function expansion circuit card), for providing an automatic testing procedure on the circuit unit 20. In practical application, for example, the computer platform automatic testing system of the invention 100 can be utilized in the design and manufacture of the computer platform 10 to provide required testing procedures, including, for example, EVT (Engineering Verification Testing) procedures, DVT (Design Verification Testing) procedures, and PVT (Production Verification Testing) procedures.

In practical implementation, the computer platform automatic testing system of the invention 100 can be fully realized by a computer program which is preinstalled to the computer platform 10 before the testing procedure. Moreover, the computer platform automatic testing system of the invention 100 is specifically designed for use with MS-DOS (Microsoft Disk Operating System) platforms, so that the computer platform 10 should be capable of being booted to the MS-DOS operating system.

As shown in FIG. 1, the modularized object-oriented component model of the computer platform automatic testing system of the invention 100 comprises: (a) a hardware specification data input module 101; (b) a hardware specification database module 102; (c) a hardware specification data retrieval module 110; (d) a testing signal generating module 120; (e) a testing signal distributing module 130; (f) a hardware control node monitoring module 140; (g) a verification module 150; and (h) a test report generating module 160.

The hardware specification data input module 101 is a human-operated data input module for a test engineer to utilize a keyboard 11 to manually input a set of hardware specification data 201 about the circuit unit 20 under test, so that the inputted hardware specification data 201 can server as a set of testing control parameters for the testing procedure. The hardware specification data 201 should at least include coded descriptions about hardware components, hardware paths, hardware control nodes, and hardware control node methods that are related to the internal architecture of the circuit unit 20 under test. In one embodiment, for example, the hardware specification data 201 include GPI (General Purpose Inputs), GPO (General Purpose Outputs), IRQ (Interrupt ReQuest) transfer, I2C (Inter-Integrated Circuit) mapping, LED (Light Emitting Diode) arrangement, key arrangement on keyboard, jumper arrangement, PCI (Peripheral Component Interconnect) configurations, fan configurations, EMI (Electromagnetic Interference) elimination methods (such as clock frequency spread spectrum, inhibiting of unused pulses, etc.), wakeup event route, to name just a few. Moreover, in a preferred mode of embodiment, the hardware specification data input module 101 utilizes TXT (Text) file format to create an electronic file for the inputted hardware specification data 201. FIGS. 2A-2B together show an example of the contents of a TXT-formatted set of hardware specification data 201 inputted by the hardware specification data input module 101.

The hardware specification database module 102 is a data storage module, which is used to store the hardware specification data 201 inputted by the hardware specification data input module 101, such as the TXT-formatted hardware specification data 201 shown in FIGS. 2A-2B. Moreover, the hardware specification data input module 101 can be used to store various other sets of hardware specification data that are related to different types of computer-dedicated circuit units for various different models of computer platforms, so that when another type of computer-dedicated circuit unit is to be tested, the corresponding set of hardware specification data can be retrieved for use in the testing procedure.

The hardware specification data retrieval module 110 is capable of responding to a test activating event 202 in actual testing of the circuit unit 20 under test by retrieving the corresponding set of hardware specification data 201 from the hardware specification database module 102 that are related to the hardware specification of the circuit unit 20 under test. The retrieved hardware specification data 201 are to be used to server as testing control parameters for controlling the testing procedure on the circuit unit 20 under test.

The testing signal generating module 120 is capable of generating a set of testing signals based on a set of testing control parameters specified by the hardware specification data 201 retrieved by the hardware specification data retrieval module 110 from the hardware specification database module 102.

The testing signal distributing module 130 is capable of distributing all the testing signals generated by the testing signal generating module 120 to specified hardware control nodes (not shown) in the circuit unit 20 under test in accordance with the descriptions of hardware components, hardware paths, and hardware control node methods specified in the retrieved hardware specification data 201.

The hardware control node monitoring module 140 is capable of monitoring the electrical responses at each hardware control node (not shown) in the circuit unit 20 under test to the testing signals distributed by the testing signal distributing module 130 thereto. The data of monitored electrical responses are then gathered and sent to the verification module 150 for verification.

The verification module 150 is capable of comparing the data of electrical responses at each hardware control node (not shown) in the circuit unit 20 that are monitored and gathered by the hardware control node monitoring module 140 against a set of standard response data specified by the hardware specification data 201 to verify whether the electrical responses to the test signals are correct. If YES, the verification module 150 issues a test-result pass message; whereas if unmatched, it issues a test-result fail message.

The test report generating module 160 is capable of responding to the test-result fail message issued by the verification module 150 by generating a test report 301 in electronic form, which lists related data about each faulted part of the circuit unit 20 being tested, including, for example, each faulted hardware control node, related data about the electrical responses at the faulted hardware control node, and related hardware components and hardware paths about the faulted hardware control node. In this embodiment, for example, the test report generating module 160 utilizes standard REP (Report) file format to generate the test report 301. FIG. 3 shows an example of the contents of a REP-formatted test report 301 generated by the test report generating module 160.

Referring to FIG. 1 together with FIGS. 2A-2B and FIG. 3, in actual operation, when a test engineer team wants to carry out a testing procedure on a computer-dedicated circuit unit 20 installed on a computer platform 10, the test engineer team needs first to utilize the hardware specification data input module 101 to manually input a set of hardware specification data 201 about the circuit unit 20 under test, including coded descriptions of hardware components, hardware paths, hardware control nodes, and hardware control node methods about the internal architecture of the circuit unit 20. The hardware specification data 201 are used to serve as a set of testing control parameters and stored into the hardware specification database module 102.

During actual testing procedure, the test engineer team can operate the computer platform 10 to initiate a test activating event 202, causing the hardware specification data retrieval module 110 to respond by retrieving the corresponding set of hardware specification data 201 from the hardware specification database module 102. The retrieved hardware specification data 201 are used to serve as a set of testing control parameters and sent to the testing signal generating module 120 which generates a set of testing signals based on the testing control parameters specified by the hardware specification data 201. Next, the testing signal distributing module 130 is activated to distribute all testing signal generated by the testing signal generating module 120 to specified hardware control nodes (not shown) in the circuit unit 20 under test in accordance with the specifications of hardware components, hardware paths, hardware control node, and hardware control node methods in the retrieved hardware specification data 201. In this time, the hardware control node monitoring module 140 monitors the electrical responses at each hardware control node (not shown) in the circuit unit 20 to the testing signals distributed by the testing signal distributing module 130 thereto. The data of monitored electrical responses are gathered and sent to the verification module 150 where the gathered data of electrical responses at each hardware control node (not shown) in the circuit unit 20 are compared against a set of standard response data specified by the hardware specification data 201 to verify whether the monitored electrical responses are correct. If YES, the verification module 150 issues a test-result pass message; whereas if NO, the verification module 150 issues a test-result fail message. The test report generating module 160 then responds to the test-result fail message by generating a test report 301 in electronic form and REP file format, which lists related data about each faulted part of the circuit unit 20 being tested, including, for example, each faulted hardware control node, related data about the electrical responses at the faulted hardware control node, and related hardware components and hardware paths about each faulted hardware control node.

After the testing procedure is completed and faulted parts in the circuit unit 20 are found, the test engineer team can then submit the test report 301 to the hardware design department for use by hardware engineers to correct the faulted parts in the circuit unit 20 being tested.

In conclusion, the invention provides a computer platform automatic testing method and system for use with a computer platform for performing an automatic testing procedure on a computer-dedicated circuit unit installed on the computer platform, and which is characterized by the capability of performing an automatic testing procedure on a computer-dedicated circuit unit based on a user-specified set of hardware specification data about the computer platform and circuit unit under test, and the capability of automatically generating a test report that lists related data about each faulted part of the circuit unit being tested. This feature allows hardware engineers to more conveniently and efficiently correct faulted parts in the circuit unit being tested. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A computer platform automatic testing method for use on a computer platform for performing an automatic testing procedure on a computer-dedicated circuit unit installed on the computer platform, the computer platform automatic testing method comprising:

building a hardware specification database for storing a set of hardware specification data about the internal architecture of the circuit unit under test, at least including coded descriptions of hardware components, hardware paths, hardware control nodes, and hardware control node methods, for use to serve as a set of testing control parameters;

during actual operation, retrieving the corresponding set of hardware specification data from the hardware specification database for the circuit unit under test;

generating a set of testing signals based on a set of testing control parameters specified by the retrieved hardware specification data from the hardware specification database;

distributing each testing signal to each actual hardware control nodes in the circuit unit under test in accordance with the descriptions of hardware components, hardware paths, and hardware control node methods specified in the hardware specification data;

monitoring the electrical response at each actual hardware control node in the circuit unit under test to the testing signals distributed thereto;

comparing the electrical response at each actual hardware control node in the circuit unit against a set of standard response data specified by the hardware specification data to verify whether the electrical responses to the test signals are correct; if YES, issuing a test-result pass message; if NO, issuing a test-result fail message; and responding to the test-result fail message by generating a test report in electronic form which lists related data about each faulted part of the circuit unit being tested.

2. The computer platform automatic testing method of claim 1, wherein the computer-dedicated circuit unit is a computer motherboard.

3. The computer platform automatic testing method of claim 1, wherein the computer-dedicated circuit unit is a function expansion circuit card.

4. The computer platform automatic testing method of claim 1, wherein the hardware specification data is formatted in standard TXT (Text) file format.

5. The computer platform automatic testing method of claim 1, wherein the test report is formatted in standard REP (Report) file format.

6. A computer platform automatic testing system for use with a computer platform for performing an automatic testing procedure on a computer-dedicated circuit unit installed on the computer platform; the computer platform automatic testing system comprising:

a hardware specification data input module, which is a human-operated data input module for inputting a set of hardware specification data about the internal architecture of the circuit unit under test, at least including coded descriptions of hardware components, hardware paths, hardware control nodes, and hardware control node methods, for use to serve as a set of testing control parameters;

a hardware specification database module, which is used to store the hardware specification data inputted by the hardware specification data input module;

a hardware specification data retrieval module, which is capable of responding to a test activating event in actual testing of the circuit unit by retrieving the corresponding set of hardware specification data from the hardware specification database module;

a testing signal generating module, which is capable of generating a set of testing signals based on a set of testing control parameters specified by the hardware specification data retrieved by the hardware specification data retrieval module from the hardware specification database module;

a testing signal distributing module, which is capable of distributing each testing signal generated by the testing signal generating module to each actual hardware control nodes in the circuit unit under test in accordance with the descriptions of hardware components, hardware paths, and hardware control node methods specified in the hardware specification data;

a hardware control node monitoring module, which is capable of monitoring the electrical response at each actual hardware control node in the circuit unit under test to the testing signals distributed by the testing signal distributing module thereto;

a verification module, which is capable of comparing the electrical response at each actual hardware control node in the circuit unit that are monitored by the hardware control node monitoring module against a set of standard response data specified by the hardware specification data to verify whether the electrical responses to the test signals are correct; if NO, capable of issuing a test-result fail message; and a test report generating module, which is capable of responding to the test-result fail message issued by the verification module by generating a test report in electronic form which lists related data about each faulted part of the circuit unit being tested.

7. The computer platform automatic testing system of claim 6, wherein the computer-dedicated circuit unit is a computer motherboard.

8. The computer platform automatic testing system of claim 6, wherein the computer-dedicated circuit unit is a function expansion circuit card.

9. The computer platform automatic testing system of claim 6, wherein the hardware specification data input module utilizes TXT (Text) file format to input the hardware specification data.

10. The computer platform automatic testing system of claim 6, wherein the test report generating module utilizes REP (Report) file format to generate the test report.

* * * * *